US007277553B2

(12) United States Patent
Reithinger

(10) Patent No.: US 7,277,553 B2
(45) Date of Patent: Oct. 2, 2007

(54) TRANSMISSION COIL SYSTEM AND REMOTE CONTROL FOR A HEARING AID

(75) Inventor: Jürgen Reithinger, Nürnberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 539 days.

(21) Appl. No.: 10/851,935

(22) Filed: May 21, 2004

(65) Prior Publication Data

US 2005/0036638 A1 Feb. 17, 2005

(30) Foreign Application Priority Data

May 22, 2003 (DE) ................................ 103 23 219

(51) Int. Cl.
*H04B 5/00* (2006.01)
*H04R 25/00* (2006.01)

(52) U.S. Cl. ...................... 381/315; 341/176; 455/41.1

(58) Field of Classification Search ................ 381/315; 455/41.1-41.3, 121, 122, 123, 124, 125
See application file for complete search history.

(56) References Cited

U.S. PATENT DOCUMENTS 4,864,633 A * 9/1989 Chatelot .................... 455/41.1
5,680,106 A * 10/1997 Schrott et al. ........... 340/10.33
6,198,971 B1 3/2001 Leysieffer
6,229,443 B1 * 5/2001 Roesner ................... 340/572.1
6,584,301 B1 * 6/2003 Bohn et al. ................ 455/41.1
6,594,370 B1 * 7/2003 Anderson ................... 381/315
2001/0046126 A1 * 11/2001 Colello ....................... 361/782
2004/0155782 A1 * 8/2004 Letkomiller et al. ...... 340/573.3

FOREIGN PATENT DOCUMENTS

CH 670349 A5 * 5/1989
DE 1938381 * 2/1971
DE 43 26 358 C1 11/1994
DE 199 15 846 C1 8/2000

* cited by examiner

*Primary Examiner*—Daniel Swerdlow
(74) *Attorney, Agent, or Firm*—Schiff Hardin LLP

(57) ABSTRACT

A transmission coil system has a first and a second transmission coil in which the first transmission coil is connectable to a stimulation unit, and the second transmission coil can be used as part of a resonant circuit which can be stimulated to resonate, and having a coil core for two transmission coils that are loosely magnetically coupled to one another in that the two transmission coils are wound alongside one another on the coil core. Stimulation of the first transmission coil leads to a resonant increase in the applied voltage in the second transmission coil, and thus to an amplified transmission power. This may be used, for example, for remote control of the hearing aid, since, for example, it allows 200 bits/s data transmission over several meters from a low-voltage source.

13 Claims, 2 Drawing Sheets

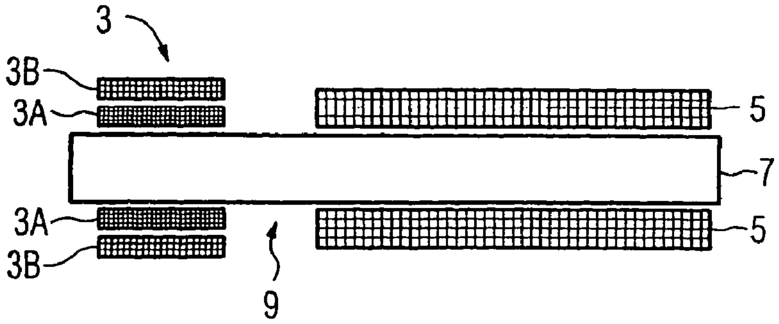
FIG 1
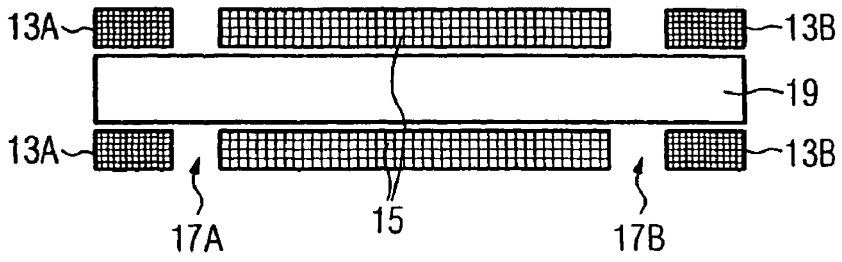
FIG 2
FIG 3
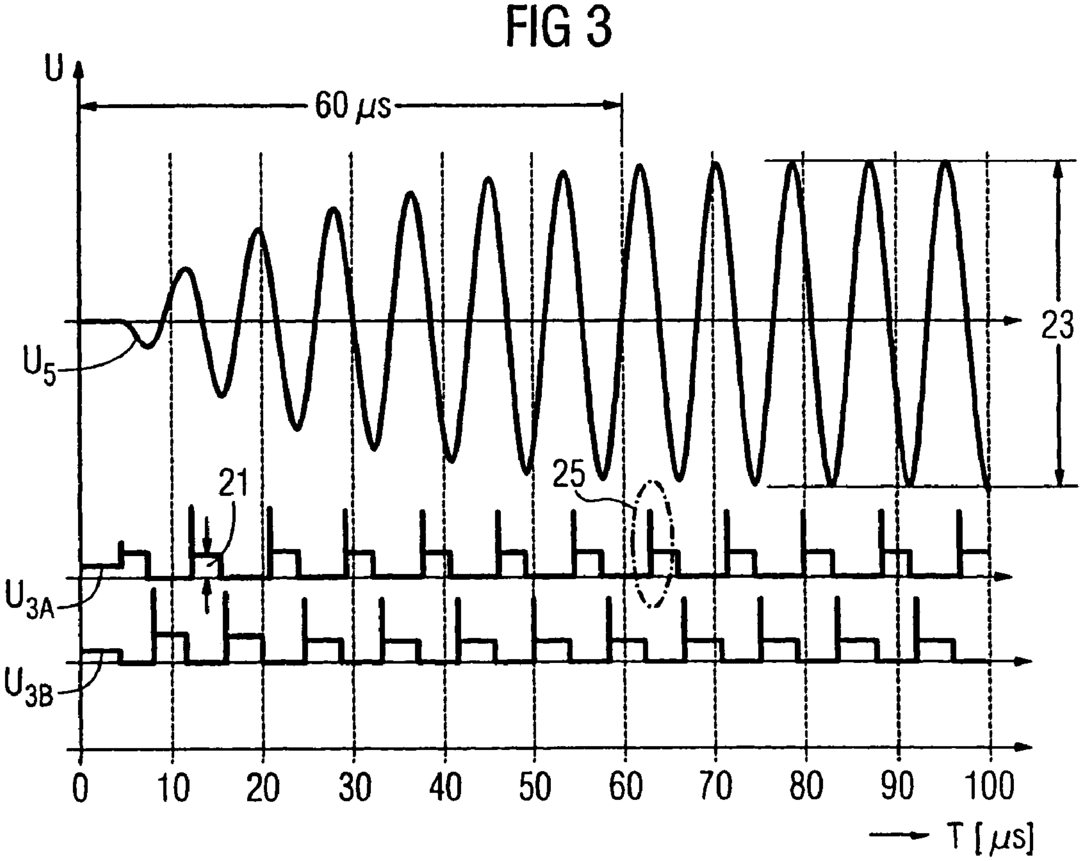

TRANSMISSION COIL SYSTEM AND REMOTE CONTROL FOR A HEARING AID

BACKGROUND OF THE INVENTION

The invention relates to a transmission coil system having a first and a second transmission coil as well as a coil core, added to a remote control for a hearing aid having such a transmission coil system.

Transmission systems which use magnetic fields produced, for example, by coils as carriers, and transmit data in an energy-efficient manner without the use of wires over short distances (e.g., several inches). Inductive transmission systems such as these generally operate at relatively low frequencies, in the region of a few kilohertz up to several hundred kilohertz.

The transmission technology for long-wave inductive data transmission is used only rarely, owing to the disadvantages of short range. This disadvantage results from the fact that the transmission field energy decreases with the third power of the distance. In order to bridge longer distances (1-2 m), comparatively high transmission power levels with strong fields are required.

A strong field with an adequate field strength can be produced by a coil with a large number of turns. A coil such as this has a correspondingly high inductance, and thus also a correspondingly high impedance. The maximum current which can be passed through the coil is obtained from the quotient of the supply voltage and the impedance.

Particularly in the case of battery-powered appliances, only a very low operating voltage is generally available. Since the coils which are used have relatively high impedances, for example 1 KΩ, the possible transmission current, and hence the transmission power as well, are greatly limited by the coil.

This means that an increase in range is associated with some technical complexity, since a method must be found to produce a higher voltage applied to the coil, particularly with the same operating voltage being produced by the battery voltage.

German patent document DE 199 15 846 C1 discloses a system, which can partially be implanted, for rehabilitation of those with hearing damage, having a wire-free telemetry device for transmission of data between a part of the system which can be implanted and an external unit.

German patent document DE 43 26 358 C1 discloses an induction coil whose coil former is formed from a stand part with two formed attachments at the end, which bind a coil winding (that is wound onto the coil former) at the side.

SUMMARY OF THE INVENTION

The invention is based on the object of providing a transmission coil system and a remote control for a hearing aid that provide a sufficiently high transmission power level, in particular for data transmission, despite a limited available supply voltage.

For a transmission coil system having a first and a second transmission coil and having a coil core, the first-mentioned object is achieved in that the first transmission coil can be connected to a stimulation unit, the second transmission coil can be used as part of a resonant circuit which can be stimulated to resonate, and the two transmission coils are wound alongside one another on the coil core, so that the two transmission coils are loosely magnetically coupled to one another.

This arrangement allows very strong transmission fields to be produced without any additional technical complexity, even though only very low operating voltages are available. For this purpose, the two transmission coils must be loosely magnetically coupled to one another. This is achieved, for example, by arranging an area without any windings between the two transmission coils. When the first transmission coil is stimulated by the stimulation unit with the aid of, for example, an alternating operating voltage, the loose coupling leads to the second transmission coil being stimulated in an increased manner by resonance. This is dependent on the two transmission coils not being subjected to the same magnetic field as is the case with rigid coupling, in which the two transmission coils are wound one above the other and not alongside one another around the coil core, that is to say they are subject to the same magnetic field.

The loose coupling results in the second transmission coil being excited with a phase shift, which results in the voltage that is applied to the second transmission coil being increased. Owing to the greater voltage, a higher current also flows, and this in turn leads to a considerably higher transmission magnetic field. The transmission power is considerably stronger than in the case of rigid coupling. This means that the transmission coil system operates considerably more effectively.

Advantageously, no additional voltage multiplier is required, or it is possible to use batteries with a lower voltage, or fewer batteries need be connected in rows. This also allows physical space to be saved.

The special arrangement and the operation that results from this now allow data to be transmitted in an energy-saving manner over relatively long distances as well.

A further advantage of the capability for long-wave data transmission via the transmission coil system is that it is possible to pass through materials without any problems, without the transmission being noticeably influenced. Particularly when using the transmission coil system with hearing aids, this is of major importance, since the transmission takes place in the area of the head and, of course, must have no influence whatsoever on the tissue.

In one advantageous embodiment, the first transmission coil has fewer windings than the second transmission coil. This allows low-impedance, low-loss, (i.e., current saving) stimulation of the first transmission coil. The second transmission coil, which can be stimulated to resonate, in contrast, has a large number of turns. Since the magnetic field is governed by the sum of the currents in all of the turns, this results in a strong transmission field. If the second transmission coil has a greater number of turns than the first transmission coil, the production of strong transmission fields is accordingly very efficient.

In one advantageous embodiment of the transmission coil system, the second transmission coil together with a capacitor forms a resonant circuit. For resonant excitation, even in the case of two-frequency stimulation (e.g., for binary data transmission), it is advantageous for the Q-factor of the resonant circuit not to be too high, i.e., for it to have a broad Q-factor distribution, which covers both of the frequencies that are used.

In one advantageous embodiment of the transmission coil system, the first transmission coil comprises two coil elements, which are arranged symmetrically with respect to the second transmission coil on the coil core. Splitting into two coil elements, for example with a center tap, has the advantage that the voltage can be supplied more easily with fewer components, for example, only two transistors, and provides the capability to arrange the coil elements symmetrically. The symmetrical arrangement itself has the advantage of a symmetrically emitted field.

If the coils are arranged asymmetrically, i.e., the first transmission coil is located on one side and the second transmission coil on the other side, the field profile that is produced is also asymmetric. This is negligible, depending on the design of the numbers of turns and the amplification.

If the transmission coil system is used for transmission and reception, a receiving coil is also required in addition to the transmission coil (the transmission coils). This receiving coil normally has considerably more turns than the transmission coils, in order to achieve voltages that are as high as possible during reception of the weak magnetic fields. For the sake of simplicity, it is advantageous to wind the transmission coils and the receiving coils on a common core. In this case, it has been found to be advantageous to use the receiving coil as the second transmission coil, particularly when transmission and reception do not take place at the same time, but when transmission and reception take place successively in time.

In this case, it is advantageous to use a film capacitor for the resonant circuit, which is used for transmission and reception and whose capacitance is not dependent on the applied voltage. This means that the resonant frequency of the resonant circuit does not change between high voltages during transmission and the low voltages during reception.

Advantageously, there is no need to wind two mutually independent transmission and receiving coils on two coil cores. Instead of this, both coils may be wound on a single core, thus making it possible to save space. Particularly in conditions such as those which occur in remote controls, little space is available for the relatively large coils of a kHz frequency band. Saving a core makes it possible to considerably reduce the volume of the transmitting (receiving) coil system, and/or, for example, of the remote control. In addition, the combination of both coils on one core during manufacture is cheaper than the production of two completely separate coils.

Since a receiving coil which is used as the second transmission coil is highly overdriven during transmission, it is advantageous in an embodiment for the receiving coil to be connected to the receiving unit via a protection circuit in order to provide protection against destruction of the receiving unit that is associated with the receiving coil.

Furthermore the second-mentioned object is achieved by the remote control for a hearing aid having a transmission coil system such as this.

Further advantageous embodiments of the invention are characterized by the features described below.

DESCRIPTION OF THE DRAWINGS

A number of exemplary embodiments of the invention are explained in the following text with reference to FIGS. 1 to 4.

FIG. 1 is a cross-section showing an asymmetric arrangement of two transmission coils in a transmission coil system;

FIG. 2 is a cross-section showing a symmetrical arrangement of two transmission coils in a transmission coil system;

FIG. 3 is a graph showing the voltage profile of the asymmetric arrangement shown in FIG. 1 when the first transmission coil is stimulated.

DETAILED DESCRIPTION OF THE PREFERRED EMBODIMENTS

Figure 4:
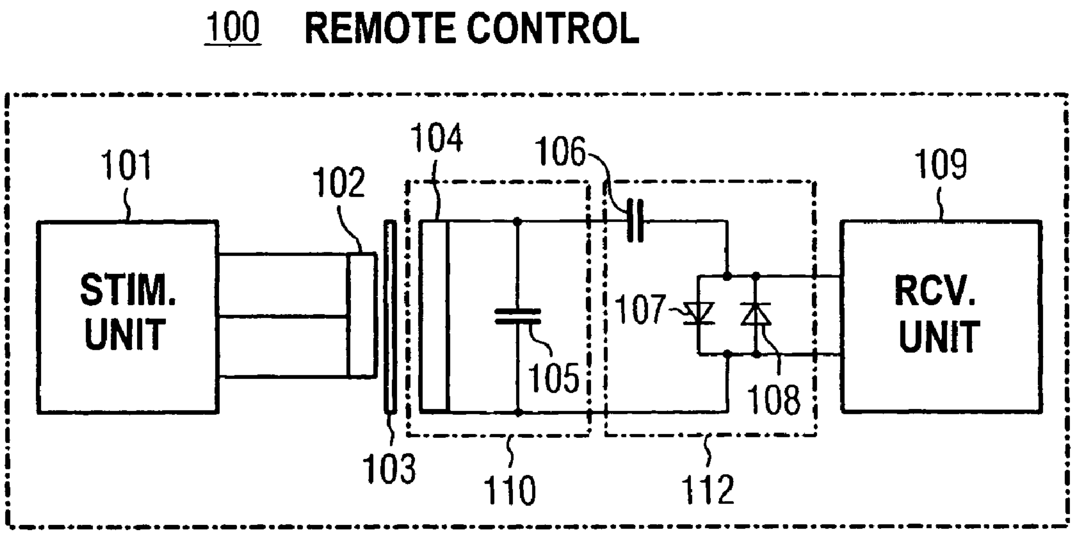
FIG. 4 is a circuit diagram of a remote control with a transmission coil system whose second coil is also operated as a receiving coil.

FIG. 1 shows an embodiment of a transmission coil system 1 for a remote control for a hearing aid. When, for example, different receiving modes are set in the hearing aid, the transmission coil system 1 can be used to achieve data rates of several hundred bits per second. The stimulation frequencies for the two-frequency stimulation that is used are 116 kHz and 121 kHz. The remote control is operated manually, so that a range of about 1-2 m is required in order to allow good communication with the hearing aid. The remote control has a convenient size. A battery, which limits the available voltage, is used as the energy source.

The transmission coil system 1 has a first transmission coil 3, a second transmission coil 5 and a coil core 7. The first transmission coil 3 comprises two coil elements 3A, 3B, formed, for example, by way of a center tap on one coil. The coil elements 3A, 3B each have, e.g., 50 windings and occupy about 10 mm of the approximately 35 mm long coil core. An approximately 5 mm long area 9 without any windings is provided adjacent to the first transmission coil 3. On the other side of the area 9 without any windings, the second transmission coil 5 is located on a length of about 20 mm, with a number of windings corresponding to about 150 turns.

The second transmission coil, together with a capacitor of, for example, 2 nF, which is not shown, forms a resonant circuit. The coil core is a ferrite core with a diameter of approximately 6 mm.

The coil elements 3A, 3B are wound one on top of the other and can be connected to a transmission unit via a center tap.

FIG. 2 shows a symmetrical arrangement of a transmission coil system 11, in which the first transmission coil (which is once again split into two coil elements 13A, 13B) is arranged symmetrically at the two ends of the second transmission coil 15. There are two areas 17A, 17B without any windings between the coil elements 13A, 13B and the second transmission coil 15. The coils are wound around a coil core 19.

FIG. 3 shows the profile of the voltages on the coils shown in FIG. 1. The graph in each case shows the voltage U plotted against the time T over the first 100 μs. This shows the alternating connection and disconnection of the voltages $U_{3A}$, $U_{3B}$, which are applied to the coil elements 3A, 3B of the first transmission coil 3 in FIG. 1. The voltage amount 21, which is applied to the coil elements 3A, 3B, is approximately 3.7 V. In addition, FIG. 3 shows the voltage profile, U5, which is applied to the second transmission coil 5. The voltage value 23, which is produced after a stabilization time of approximately 60 μs, is approximately 80 V. This corresponds to a considerably resonantly increased voltage on the second transmission coil 5, by a factor of 10. If the couplings were rigid, this would result in a maximum factor of 3 in the amplification as a result of the ratio of the number of windings.

The considerably higher voltage means that a considerably higher current also flows, and this in turn leads to considerably stronger magnetic fields. The current drawn by the entire system is increased only slightly. In contrast, the transmission power is increased considerably owing to the more effective operation of the system, without any additional hardware being required for this purpose.

The voltage profiles $U_{3A}$, $U_{3B}$ also show a voltage spike 25, which is produced by the reaction of the second transmission coil 5.

FIG. 4 shows a remote control 100 for a hearing aid, based on a schematic circuit diagram. The stimulation unit 101 is equipped with one or more transmission coils 102. The transmission coils are loosely coupled via a common core 103 to a receiving coil 104, which is used as the second transmission coil. The arrangement of the coils 102,104 corresponds, for example, to the arrangements shown in FIGS. 1 or 2. A resonant circuit capacitor 105 is connected in parallel with the receiving coil 104. The two poles of the parallel resonant circuit 110 formed in this way are connected to a protection circuit comprising a protection capacitor 106 and a parallel circuit, connected in series with it, of two back-to-back parallel-connected diodes 107 and 108. The parallel-connected diodes 107 and 108 are connected to the input of a receiving unit 109.

The method of operation of this circuit will be explained in more detail in the following text. The separate receiving coil 104, which is required in any case, is wound on the same core alongside the transmission coils 102, and is loosely coupled to it. As a result, the receiving coil 104 (which, together with its associated capacitor 105, represents the complete resonant circuit 110) is thus likewise stimulated to oscillate by the transmission coils 102. Since the receiving coil 104 has more turns than the transmission coils 102, relatively high voltages are produced during the transmission process in the resonant circuit 110, which is stimulated to resonate, and, due to the oscillation effect in the resonant circuit 110, these also once again lead to quite high currents, and thus emitted magnetic fields, despite the large number of turns. The actual transmission coils 102 now supply only the emitted energy. There is therefore no longer any need for as much current to flow through the transmission coils 102. The strong transmission field is now produced by the receiving coil 104, which is excited by the transmission coils 102.

As a result of the excitation by the transmission coils 102, which are externally controlled, the frequency is also absolutely stable and can be predetermined from the outside. Component tolerances in the resonant circuit 110 thus have no influence on the transmission frequency, and, to a certain extent, affect only the efficiency of the transmission process.

The inductances of the transmission coils 102 change the inductance of the loosely coupled receiving coil 104, so that the natural frequency of the resonant circuit 110 must be corrected after a change to the associated capacitance value of the resonant circuit capacitor 105. The inductance of the resonant circuit 110 becomes smaller, that is to say the capacitance of the resonant circuit 110 must be increased. A capacitance which is suitable for this purpose can be connected without any problems, such that it at the same time provides protection for the sensitive receiving unit 109. Since a protection circuit 112 such as this is required in any case, this circuit solution does not require any additional components. The protection circuit 112 comprises only the correction capacitor 106 and the back-to-back parallel-connected diodes 107 and 108, which are connected in parallel with the capacitor 105 of the resonant circuit 110. The received signals are tapped off on the diodes 107, 108.

The high voltages, typically of about ±50 V, which are produced in the transmission mode result in the diodes 107, 108 being forward-biased, and the capacitor 106 (which is connected upstream of the them) thus being connected in parallel with the resonant circuit capacitor 105 in the receiving circuit. This corrects the resonant frequency of the resonant circuit 110 for the transmission mode. At the same time, the signals at the input of the high-impedance receiver are limited by the diodes 107, 108 to a maximum of approximately 0.7 V. Most of the voltage that is produced by the resonant circuit 110 is then dropped across the protection capacitor 106.

In the reception mode, the received signals are so small that the diodes 107, 108 are reverse-biased. The voltages of the received signals typically reach at most the mV range. As a result, only the original resonant circuit capacitor 105 is still active. At the same time, the transmission coils 102 are switched off. This means that at least one connection of each transmission coil 102 is open. As a result, it no longer acts on the resonant circuit 110. It can thus oscillate freely at its reception frequency, to which it is tuned. The signal is thus transmitted onwards, virtually without any losses, and via the protection or correction capacitor 6, to the protection diodes 107, 108. Since the received voltage is low, these diodes 107, 108 are reverse-biased. This means that the received voltage can be tapped off in its entirety at the diode connections from the high-impedance receiver input.

Thus, in addition to having the advantage that the receiving coil can be used as a transmission amplifier, the proposed circuit also has the advantage that it occupies less space, since a common core is used for the transmission and receiving coils, and the protection capacitor is at the same time also used as a correction capacitor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components. Such functional blocks may be realized by any number of hardware and/or software components configured to perform the specified functions. For example, the present invention may employ various circuit components. Furthermore, the present invention could employ any number of conventional techniques for electronics configuration and the like. The particular implementations shown and described herein are illustrative examples of the invention and are not intended to otherwise limit the scope of the invention in any way. For the sake of brevity, conventional electronics and other functional aspects of the systems (and components of the individual components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A transmission coil system for a remote control, comprising:

a first and a second transmission coil having a coil core, the first transmission coil being connectable to a stimulation unit, the second transmission coil configured as part of a resonant circuit which can be stimulated to resonate, the two transmission coils being wound alongside one another on the coil core so that the two transmission coils are loosely magnetically coupled to one another.

2. The transmission coil system as claimed in claim 1, further comprising:

a winding-free area arranged between the two transmission coils.

3. The transmission coil system as claimed in claim 1, wherein the first transmission coil has fewer windings than the second transmission coil.

4. The transmission coil system as claimed in claim 1, further comprising:

a capacitor that together with the second transmission coil forms the resonant circuit.

5. The transmission coil system as claimed in claim 4, wherein the capacitor is a film capacitor.

6. The transmission coil system as claimed in claim 1, wherein the first transmission coil comprises two coil elements which are arranged symmetrically with respect to the second transmission coil on the coil core.

7. The transmission coil system as claimed in claim 1, wherein the first transmission coil is configured to be connected to a stimulation unit for two-frequency stimulation.

8. The transmission coil system as claimed in claim 1, wherein the second transmission coil is a receiving coil for a receiving unit.

9. The transmission coil system as claimed in claim 1, further comprising:

a protection circuit, via which the second coil is connected to a receiving unit, for protection of the receiving unit in a transmission mode.

10. The transmission coil system as claimed in claim 1, wherein the stimulation unit is a unit that stimulates the first transmission coil.

11. The transmission coil system as claimed in claim 1, wherein the first transmission coil is directly connected to the stimulation unit.

12. A remote control comprising a transmission coil system, the transmission coil system comprising:

a first and a second transmission coil having a coil core, the first transmission coil being connectable to a stimulation unit, the second transmission coil configured as part of a resonant circuit which can be stimulated to resonate, the two transmission coils being wound alongside one another on the coil core so that the two transmission coils are loosely magnetically coupled to one another.

13. The remote control as claimed in claim 12, wherein the remote control is configured as a remote control for a hearing aid.

* * * * *